United States Patent
Brinkman et al.

(10) Patent No.: US 11,233,713 B2
(45) Date of Patent: Jan. 25, 2022

(54) CONTROLLER AREA NETWORK AND CONNECTIVITY HEALTH TROUBLESHOOTING SYSTEM

(71) Applicant: Deere & Company, Moline, IL (US)

(72) Inventors: Jason E. Brinkman, Cedar Falls, IA (US); Curtis P. Ritter, Waterloo, IA (US); Matthew R. Zebarth, East Moline, IL (US); David C. Smart, Waterloo, IA (US); Warren L. Schroeder, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 208 days.

(21) Appl. No.: 16/516,833

(22) Filed: Jul. 19, 2019

(65) Prior Publication Data

US 2021/0021497 A1    Jan. 21, 2021

(51) Int. Cl.
*H04L 12/26* (2006.01)
*G05B 23/02* (2006.01)
*H04L 12/40* (2006.01)

(52) U.S. Cl.
CPC ...... *H04L 43/0811* (2013.01); *G05B 23/0221* (2013.01); *H04L 12/40* (2013.01); *H04L 2012/40215* (2013.01)

(58) Field of Classification Search
CPC ............. B66B 1/3415; G05B 23/0221; G06F 11/1633; G07C 5/0808; G07C 5/008; G07C 5/085; H04L 12/40; H04L 43/045; H04L 43/0811; H04L 43/0847; H04L 2012/40215; H04L 2012/40273
See application file for complete search history.

(56) References Cited

U.S. PATENT DOCUMENTS

| | | | |
|---|---|---|---|
| 6,330,499 B1 * | 12/2001 | Chou | G07C 5/008 701/31.4 |
| 8,699,356 B2 | 4/2014 | Smart et al. | |
| 2008/0186870 A1 * | 8/2008 | Butts | H04L 43/0847 370/252 |
| 2012/0041635 A1 | 2/2012 | Johnson et al. | |
| 2015/0347258 A1 | 12/2015 | Du et al. | |
| 2016/0163125 A1 | 6/2016 | Kim | |
| 2019/0120159 A1 | 4/2019 | Brinkman et al. | |

OTHER PUBLICATIONS

European Search Report issued in counterpart application No. 20186767.8 dated Nov. 25, 2020 (09 pages).

* cited by examiner

*Primary Examiner* — Marsha D Banks Harold
*Assistant Examiner* — Dharmesh J Patel
(74) *Attorney, Agent, or Firm* — Michael Best & Friedrich LLP (57) ABSTRACT

A system and method for diagnosing connection and communication in an industrial machine includes performing a software check to obtain software data related to software applications, performing a connectivity check to obtain connection status data for one or more controllers, and performing a CAN bus check to obtain CAN bus data. The software data, connection status data, and CAN bus data is analyzed to determine a likely cause of an industrial machine connection or communication issue. A solution to the industrial machine connection or communication issue is output to a technician based on the analyzed data.

20 Claims, 7 Drawing Sheets

| ECU | TLA | CAN Bus # | Error Counts | DTCS | Nominal Voltage | Active Injection Voltage Result | Comparison Expected vs. Responding |
|---|---|---|---|---|---|---|---|
| NUMERICAL DESIGNATION | Three letter acronym for the specific controller | 1,2,3,4 | RANGE FROM 95-63,500 | LIST – SPN FMI | Normal: 1.5V<=CANL <=2.5V 2.5V<= CANH <=3.5V | Example Error: CANL<1.5V, Or CANH>3.5V Error Could be on one, the other, or both. The 1.5 and 3.5 are not "absolute", but approximate based on normal systems. | ✓ or ✗ |
| 1 | ABC | 1 | 24,000 | | CANL=2.1V, CANL=3.1V | CANL=2.3V, CANL=2.8V | ✓ |
| 1 | ABC | 1 | 24,250 (same ECU, just differing based on time of sample) | | CANL=1.9V, CANL=2.8V | CANL=2.2V, CANL=2.8V | ✓ |
| 2 | BCD | 2 | 63,500 | | CANL=1.0V, CANL=2.8V | CANL=2.3V, CANH=3.9V | ✓ |
| 3 | GHI | 2 | 350 | | | | ✓ |
| 4 | ... | 3 | 220 | | | | ✓ |
| 5 | ... | 3 | 450 | SPN 629 FMI 12 SPN 629 FMI 13 | | | ✓ |
| 6 | ... | 3 | 200 | | | | ✓ |
| 7 | ... | 3 | 95 | | | | ✓ |
| 8 | ... | 4 | No Response | | | | ✗ |
| 9 | XYZ* | 4 | Exception | N/A | N/A | N/A | N/A |

CONTROLLER AREA NETWORK AND CONNECTIVITY HEALTH TROUBLESHOOTING SYSTEM

FIELD

Various exemplary embodiments relate to performing diagnostic tests to determine the health of electronic and software system components of industrial machines.

BACKGROUND

Modern industrial machines, which can include industrial vehicles (e.g., agricultural, construction, forestry, mining vehicles, etc.) and stationary industrial equipment (e.g. generators, pumps, compressors, etc.) are complex systems that can include numerous Electronic Control Modules (ECMs) and/or units (ECUs). Due to this complexity, diagnosing failures in communication systems (i.e. Controller Area Networks (CAN), Local Interconnect Network (LIN), Ethernet, etc.) is becoming more difficult. Certain industrial machines are equipped with internal diagnostic systems. Internal systems however, may be limited in scope due to size, cost, or performance considerations. Technicians and service centers are often equipped with significantly more robust and sophisticated diagnostic capabilities for other industrial machine systems but not necessarily for CAN and connectivity issues.

The complexity of the systems can result in a technician traveling to the location of the machine and spending a significant amount of time trying to establish or diagnose communication issues instead of addressing the customer's complaint. Additionally, Diagnostic Trouble Codes (DTCs) may or may not be present for issues that can be caused by a network component problem (wiring, termination, etc.) or by a faulty ECM. Technicians often do not have the proper training to diagnose a CAN or connectivity issue at a remote site, and will therefore struggle to eliminate potential causes of a problem. There remains a need to self-diagnose potential issues and step technicians through the troubleshooting process. Improved systems and methods of diagnosis and service of the engine (and entire machines) can reduce the amount of time it takes a technician to resolve issues with communication and connectivity resulting in improved machine uptime and the customer experience.

SUMMARY

An exemplary embodiment includes a method of diagnosing a connection or communication issue with an industrial machine. The method includes connecting to an electronic processing system of an industrial machine. The electronic processing system includes a CAN bus and a plurality of controllers connected to the CAN bus, the plurality of controllers programmed to run one or more software applications. A software check is performed to obtain software data related to the software applications. A connectivity check is performed to obtain connection status data for one or more of the controllers. A CAN bus check is performed to obtain CAN bus data. The software data, the connection status data, and the CAN bus data are analyzed to determine a likely cause of an industrial machine connection or communication issue. A solution to the industrial machine connection or communication issue is output to a technician based on the analyzed data.

According to another exemplary embodiment, an industrial machine connection and communication diagnostic system includes a communication interface and a diagnostic module. The communication interface is configured to connect to an electronic processing system of an industrial machine. The electronic processing system includes a CAN bus and a plurality of controllers connected to the CAN bus, the plurality of controllers programmed to run one or more software applications. The diagnostic module is configured to initiate a software check to obtain software data related to the software applications, initiate a connectivity check to obtain connection status data for one or more of the controllers, and initiate a CAN bus check to obtain CAN bus data. The diagnostic module analyzes the software data, the connection status data, and the CAN bus data to determine a likely cause of an industrial machine connection or communication issue and outputs a solution to the industrial machine connection or communication issue to a technician based on the analyzed data.

According to another exemplary embodiment, an industrial machine connection and communication diagnostic system includes a communication interface and a diagnostic module. The communication interface is configured to connect to an electronic processing system of an industrial machine. The electronic processing system includes a CAN bus and a plurality of controllers connected to the CAN bus, the plurality of controllers programmed to run one or more software applications. The diagnostic module is configured to initiate a controller response check. The controller response check includes determining the number of controllers and the controller layout, request a response from each controller, provide a graphical representation of the controller layout, determine a fault, and display the location of the fault on the graphical representation.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
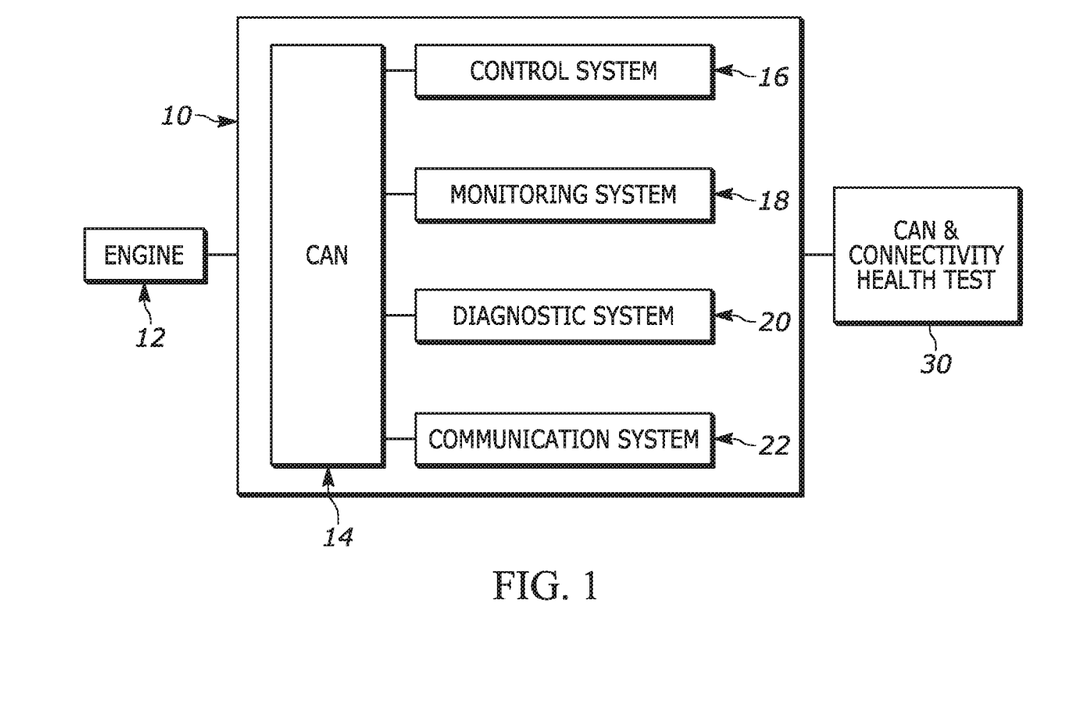
FIG. 1 is a schematic view of an industrial machine electronic system.

FIG. 1 shows an exemplary embodiment of an electronic system 10 associated with an industrial machine. The electronic system 10 can include the different hardware and software components utilized in the operation of the industrial machine. In some embodiments, the electronic system 10 is connected to industrial components 12. In some embodiments, the industrial components 12 can include an engine that is part of a vehicle that contains one or more ground engaging members, for example tires or treads, that are powered by the engine. The industrial components can also include transmissions, HVAC systems, tools or other work implements. Certain embodiments can also be directed to other types of moving or stationary machines that utilize an engine, for example a diesel engine used in a generator.

In the exemplary embodiment shown in FIG. 1, the electronic processing system 10 includes a CAN bus 14 in communication with various components including a control system 16, a monitoring system 18, a diagnostic system 20, and a communication system 22. The electronic system 10 is configured to diagnose or at least partially diagnose different error conditions in the industrial machine.

The electronic processing system 10 can include one or more of a data processor and a data storage component. The electronic processing system 10 can be implemented by a general purpose computer that is programmed with software applications. The CAN bus 14 provides communication between the different components. The control system 16 can include one or more controllers or electronic control units or modules, for example an engine control unit. The control system 16 can include software and/or firmware stored in memory to perform different operations and tasks.

The monitoring system 18 can include various sensors or other measurement devices used to monitor the status of components in the industrial machine. For example, the monitoring system can collect voltage information associated with different sensors, and this information can be compared to stored values in a chart or table. Based on discrepancies between the actual and stored values, error codes or diagnostic trouble codes (DTCs) can be generated, either by the control system 16 or the diagnostic system 20.

The diagnostic system 20 can be configured to perform multiple tasks, including initiating tests and recording errors sensed by the monitoring system 18. The diagnostic system 20 can receive and record, for example through a software module or instructions for analyzing, the results of diagnostic tests, fault codes, error messages, status messages, or test results provided by the monitoring system 18. The diagnostic system 20 can also be capable of analyzing or comparing the information provided by the monitoring system 18 to a database that contains prior information related to the industrial machine and standard operating information. The diagnostic system 20 can record and store data associated with the industrial machine, and transfer that data via the communication system 22 to an output, for example a local output and/or a remote location. A local output can be a screen or other user interface associated with the system 10 or a user access device that is connected to the system, for example through a hard wired electronic data link connection (e.g., SAE J1939/USB), or through a wireless connection (e.g., Wi-Fi, Bluetooth, or other near field communication). A remote location can include transferring data via the communication system 22 over a network to a dealer or service center.

Locally, the information can be processed by an access device, such as a technician computer. The technician may also be able to access a controlled menu via an onboard computer system. At a remote location, the service center can receive the transmitted data and then process the data to provide a recommendation to a technician. The data can be processed by one or more data processing systems that can include a server, central processing unit, software modules or programmable logic, and electronic memory. In certain instances, the recommendation identifies a reduced number of potential sources of the problem from the maximum potential sources to allow the technician to carry fewer parts or less equipment when visiting a location. The diagnostic system 20 also may be capable of producing, storing, or communicating DTCs.

The electronic processing system 10 can utilize other components including processors, data storage, data ports, user interface systems, CAN buses, timers, etc., as would be understood by one of ordinary skill in the art.

The communication system 22 is configured to locally and remotely communicate information over a communication network. The communication system 22 can provide communication over different wired connections (e.g., SAE J1939), wireless systems and networks (e.g., mobile, satellite, Wi-Fi, near-field, Bluetooth), or a combination thereof as needed. In some embodiments, the communication system 22 can include or interact with a Vehicle Communication Interface (VCI). For example, the communication system 22 can include a diagnostic connector on the machine which is accessible to a user. The user can connect to the diagnostic connector with a diagnostic plug that connects to a VCI system which can then transfer information to a user's diagnostic tool, such as a PC, laptop, tablet, or other computing device.

In some embodiments, the communication system 22 includes a telematics system. The telematics system includes, for example, a network of regional, national, or global hardware and software components. In addition, the telematics service may be provided by a private enterprise, such as an independent third-party company that provides the service to other companies, a manufacturing company that provides the service to its customers, or a company that provides the service to its own fleet of vehicles. Alternatively, the telematics service may be provided by a governmental agency as a public service. JDLink™ is an example of a telematics service, which is available from John Deere & Company.

According to an exemplary embodiment, the diagnostic system can include a CAN and connectivity health test (CCH) 30 that helps a technician troubleshoot complex controller network connectivity and communication issues. Problems can be caused by hardware, software, and/or operating state of the industrial machine components. Examples of such issues include faulty CAN signals, noisy controllers, and poor connections. Technicians often do not have the proper training to diagnose a CAN or connectivity issue and will therefore struggle to eliminate potential causes of a problem. Various exemplary embodiments are directed to being able to help a technician more efficiently troubleshoot these issues.

In some embodiments, the electronic system 10 can have CCH 30 capabilities built in, for example in the diagnostic system. In some embodiments, the CCH 30 capabilities are included in a diagnostic module. The diagnostic module could be a physical device, or in the technician's service tool/laptop, or a software application or utility, or in an operator display on the machine. In some embodiments, the CCH 30 capabilities are included in a remote system such as implemented via a computer web interface or dashboard. In some embodiments, the CCH capabilities are included in communication devices such as cell phones and tablets.

In one exemplary embodiment, the CCH 30 checks that the technician laptop and service tool software application has all of the files, software, components, drivers, etc. needed to successfully connect to and communicate with a machine. In this embodiment, the CCH 30 also checks that a Vehicle Communication Interface (VCI) is connected to the technician laptop via USB, Bluetooth, or Wi-Fi, connected to the machine via a diagnostic connector, and able to communicate with the machine CAN bus. The CCH 30 also checks the CAN bus to detect hardware or wiring issues that need to be repaired, controller issues that need to be addressed, or communication issues such as Bus loading, interfering devices, intermittent issues, etc.

Various exemplary embodiments can also include checking that the electronic system, diagnostic module, remote system, or communication devices described previously have all of the files, software, components, drivers, etc. needed to successfully connect to and communicate with a machine.

The specification references CAN for consistency, but CAN is only an example, and the methods described can readily apply to CAN, Wired Ethernet, LIN, Wi-Fi, and other technologies. Additionally, some examples described herein refer to capabilities of the SAE J1939 and ISO 11783 CAN-based communications protocols, but the methods are applicable to other protocols in addition to other physical layers (CAN v. Ethernet).

Figure 2:
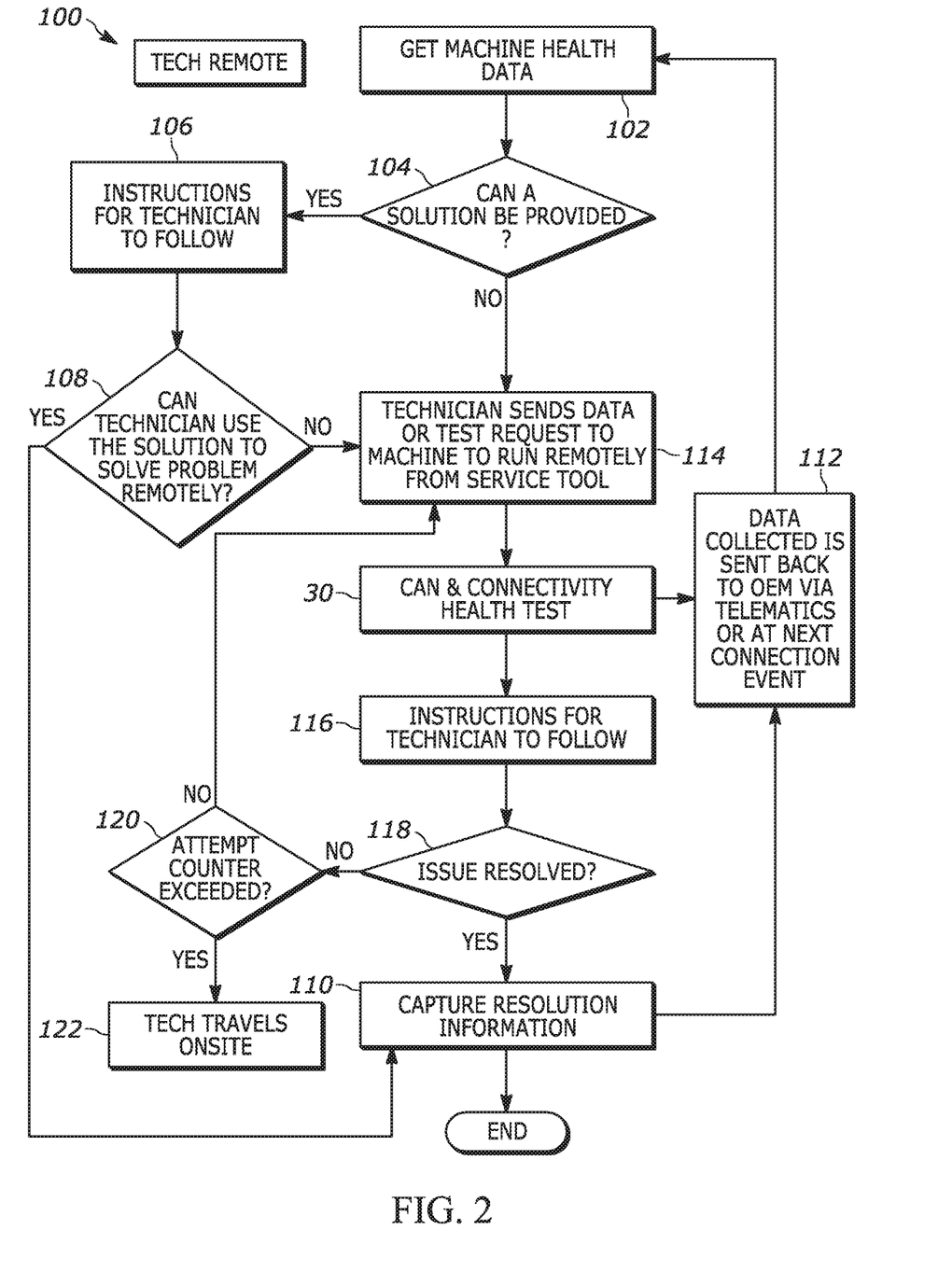
FIG. 2 is a flow chart illustrating a remote industrial machine diagnostic procedure.

FIG. 2 shows an exemplary embodiment of a remote diagnostic procedure 100 that utilizes a CAN and connectivity health test system and method 30 (CCH). The CCH 30 can be configured to perform multiple tasks, including initiating tests and recording data associated with the electronic processing system 10. The CCH 30 can be a diagnostic module (hardware or software) configured to receive and analyze data from the electronic processing system 10, for example through a software module or instructions for analyzing, the results of diagnostic tests, fault codes, error messages, status messages, or test results provided by the electronic processing system 10. The CCH 30 can also be capable of analyzing or comparing the information provided by the electronic processing system 10 to a database that contains prior information related to the industrial machine and standard operating information. The CCH 30 can also include memory for storing and archiving data.

The CCH 30 includes a communication interface for connecting to and communicating with the electronic processing system 10. The communication interface can include wired and wireless connections capable of local and/or remote outputs. A local output can be a screen or other user interface associated with the CCH 30 or a user access device that is connected to the system, for example through a hard wired electronic data link connection, such as a 9-pin connection, or through a wireless connection such as Wi-Fi, Bluetooth, or other near field communication. A remote location can include transferring data over a network to a dealer or service center.

Locally, the information can be processed by an access device, such as a technician computer. The technician may also be able to access a controlled menu via an onboard computer system. At a remote location, the service center can receive the transmitted data and then process the data to provide a recommendation to a technician. The data can be processed by one or more data processing systems that can include a server, central processing unit, software modules or programmable logic, and electronic memory. In certain instances, the recommendation identifies a reduced number of potential sources of the problem from the maximum potential sources to allow the technician to carry fewer parts or less equipment when visiting a location.

The CCH 30 can utilize other components including processors, data storage, data ports, user interface systems, CAN buses, timers, etc., as would be understood by one of ordinary skill in the art.

This diagnostic procedure can be performed at a remote location using data sent over a network. When a user (e.g., service dealer, technician, etc.) learns of a problem with an industrial machine, they can initially retrieve the machine health data (step 102). In some embodiments the machine has telematics available which sends machine health data on a regular basis to a data center or other automated system. The machine health data can be used for manually or automatically creating a solution (step 104) that is then sent to the dealer technician to aid in the diagnosis/repair.

If a solution is provided, the technician is given instructions to follow (step 106). If the solution is used to solve the problem remotely (step 108), resolution information is captured (step 110) and sent to the original equipment manufacturer (OEM) for analytics (step 112). Remotely can mean that the technician is offsite from the machine and is connecting to the machine via cellular, satellite, or other possible means of communication. An example of a solution that can be performed remotely might be a software update to a controller or other device that resolves the issue. It could be delivered automatically via a delivery system (to one or many machines), or an alert is sent to the dealer and the update is sent by request of the OEM or service center.

If a solution is not provided or the issue is not resolved, the technician sends a request (step 114) to run the CCH 30 remotely from the service tool. The CCH 30 can be initiated remotely or via a hardwired connection at the machine. For example, the technician may need to be at the machine to determine if it is in a safe state for the test to be performed, or it may require parts replacement or other repairs to be completed before the test is performed. The CCH 30 collects available data and performs analysis of results as discussed in further detail below. The CCH 30 provides a solution output (step 116) which can include instructions or next best action for the technician to follow. These instructions can be either the next steps listed that reside in the CCH 30 and/or it can be a link to a support portal. The support portal can include a document with steps for the technician to perform. The support portal can also provide access to information in a database. The support portal can also include a real-time monitoring center. The support portal can be an interactive system that allows the CCH 30 or technician to provide input, to which the interactive system provides changing steps based on the input. The technician may be able to solve the issue (step 118) based on those results. If the issue is resolved the information is captured (step no) and sent to the OEM (step 112). Resolution feedback can be log files, manual feedback (multiple choice), auto feedback, etc. An example could be that the CCH 30 determines if a part was replaced, software was updated, wiring was repaired, etc.

If the issue is not resolved, the technician has the opportunity to rerun the process remotely until either the issue is resolved or an attempt counter is exceeded (step 120). Once the attempt counter has been exceeded, technician is directed to travel to the machine (step 122).

Figure 3:
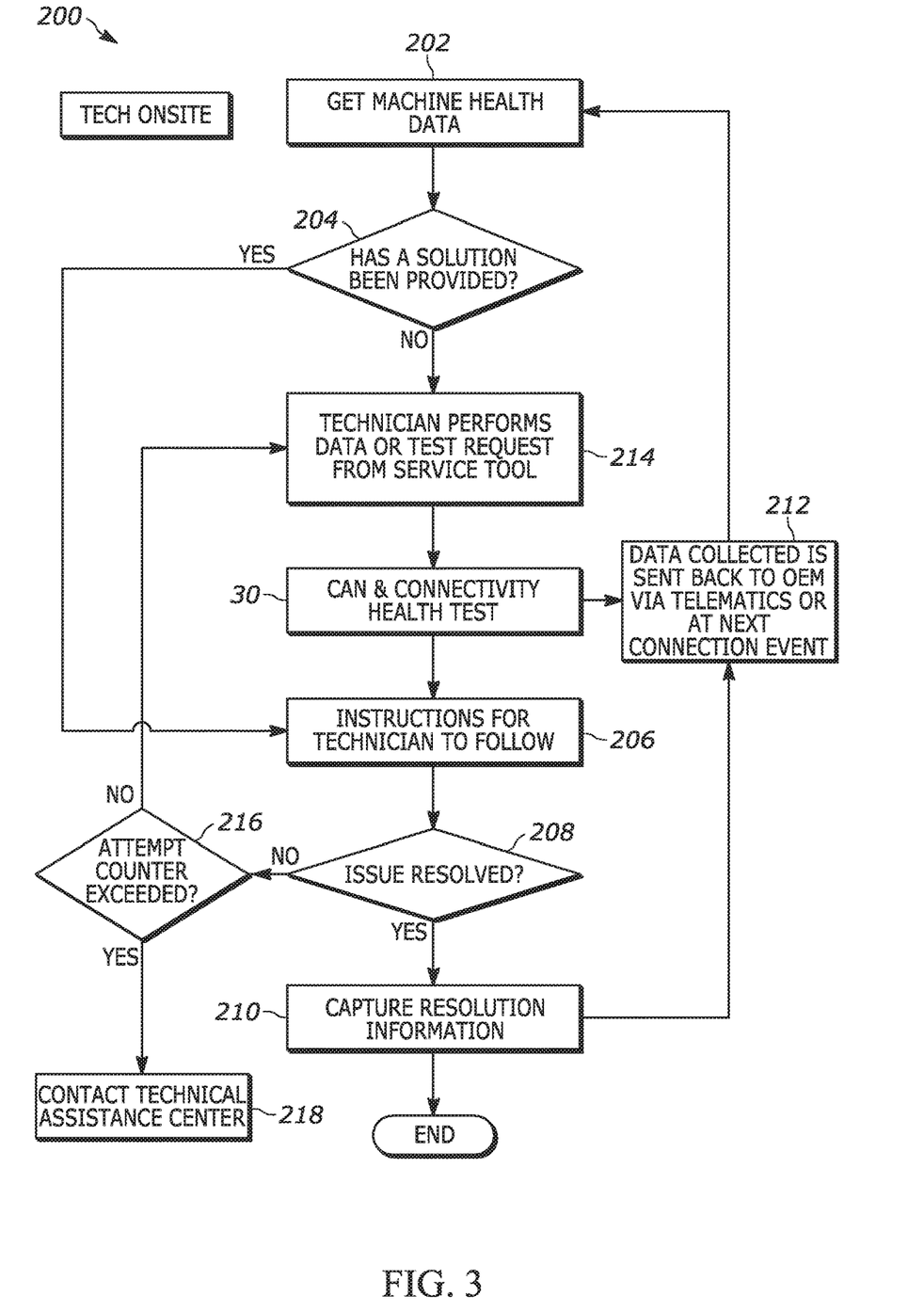
FIG. 3 is a flow chart illustrating an on-site industrial machine diagnostic procedure

FIG. 3 shows an exemplary embodiment of an onsite diagnostic procedure 200 that utilizes the CCH 30. At the machine, onsite machine health data is analyzed (step 202). The onsite machine health data can include the existing data received remotely (step 102) as well as any new or updated data. The data is used to create a new solution (step 204) either manually or automatically that is sent to the technician to aid in the diagnosis/repair. If a solution output (step 206) is provided, the technician is given instructions to follow. For example, during an attempt to program an engine controller, it may be possible that another controller is not following network protocol and is overloading the bus or not responding to a bus quiet command. The controller therefore may need to be physically disconnected while the engine controller is reprogrammed. If the solution is used to solve the problem (step 208), resolution information is captured (step 210) and sent to the OEM for analytics (step 212).

If a solution is not provided or the issue is not resolved, the technician sends a request (step 214) to run the CCH 30 while connected (blue tooth, Wi-Fi, hard wired, etc.) with the service tool or diagnostic software program. The CCH 30 may or may not be an identical test and analysis when initiating remotely versus a hardwired connection at the machine as described previously. The CCH 30 collects and analyzes available data to provide instructions or the next best action for the technician to follow (step 206). An example of this scenario is the service tool or diagnostic software program is missing connectivity files or application components necessary for proper operation. The technician may be able to solve the issue based on the output from the CCH 30. If the issue is resolved the information is captured (step 210) and sent to the OEM (step 212).

If the issue is not resolved, the technician has the opportunity to rerun the process until either it is resolved or an attempt counter is exceeded (step 216). Once the attempt counter has been exceeded the CCH 30 directs the technician to contact the Technical Assistance Center for further troubleshooting assistance (step 218).

When the CCH 30 is activated, all data collected by the troubleshooting system and/or the technician can be bundled and sent back to the OEM from the service tool to be analyzed and compiled to create possible new solutions. The CCH 30 can include a database that is updated for redirecting the technician to the next best action. The technician is also prompted to provide feedback regarding whether the solutions helped resolve the issue. This data is captured and bundled with the aforementioned data.

Figure 4A:
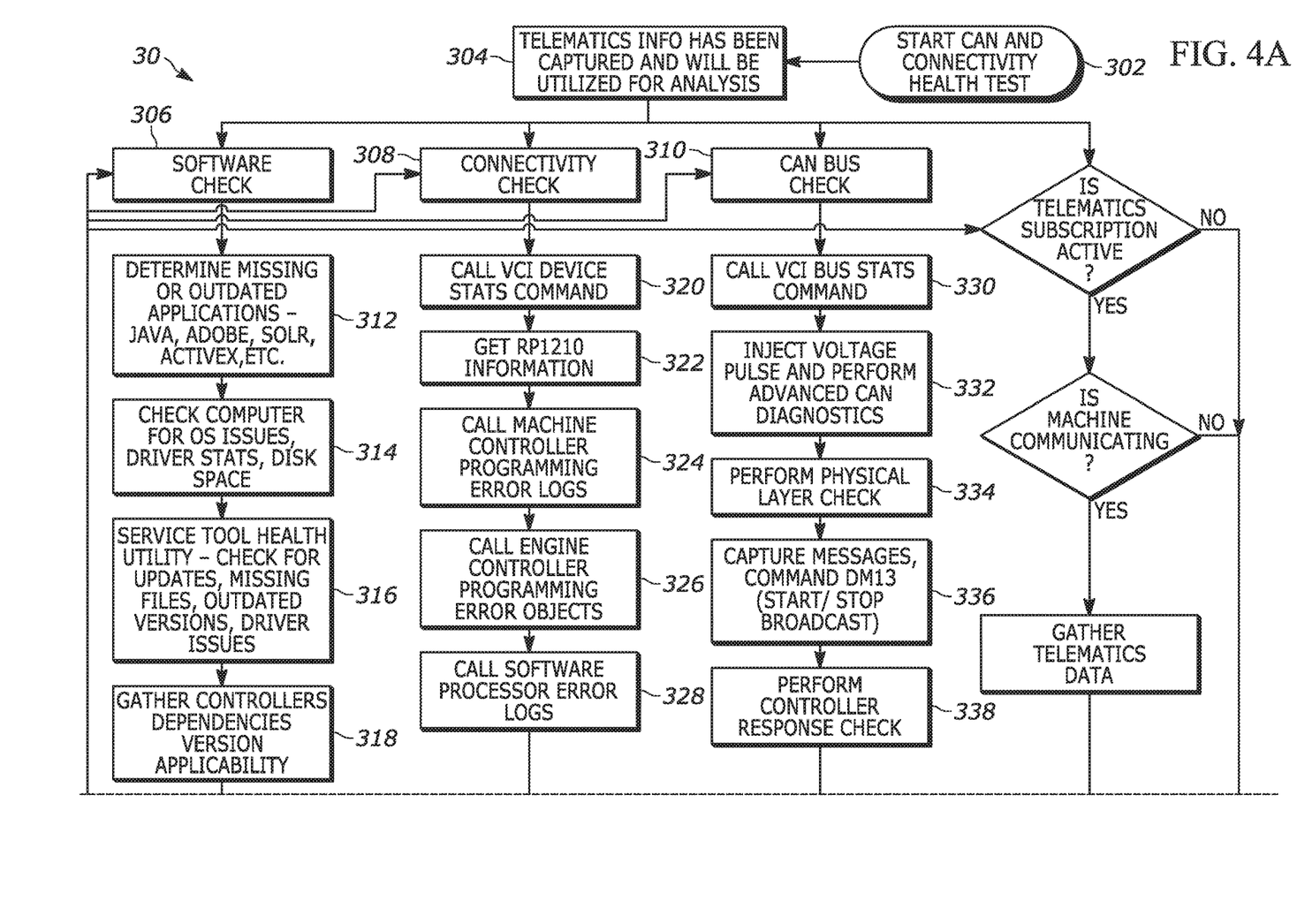
FIGS. 4A and 4B show a flow chart illustrating a CAN and connectivity health test system and method.
Figure 4B:
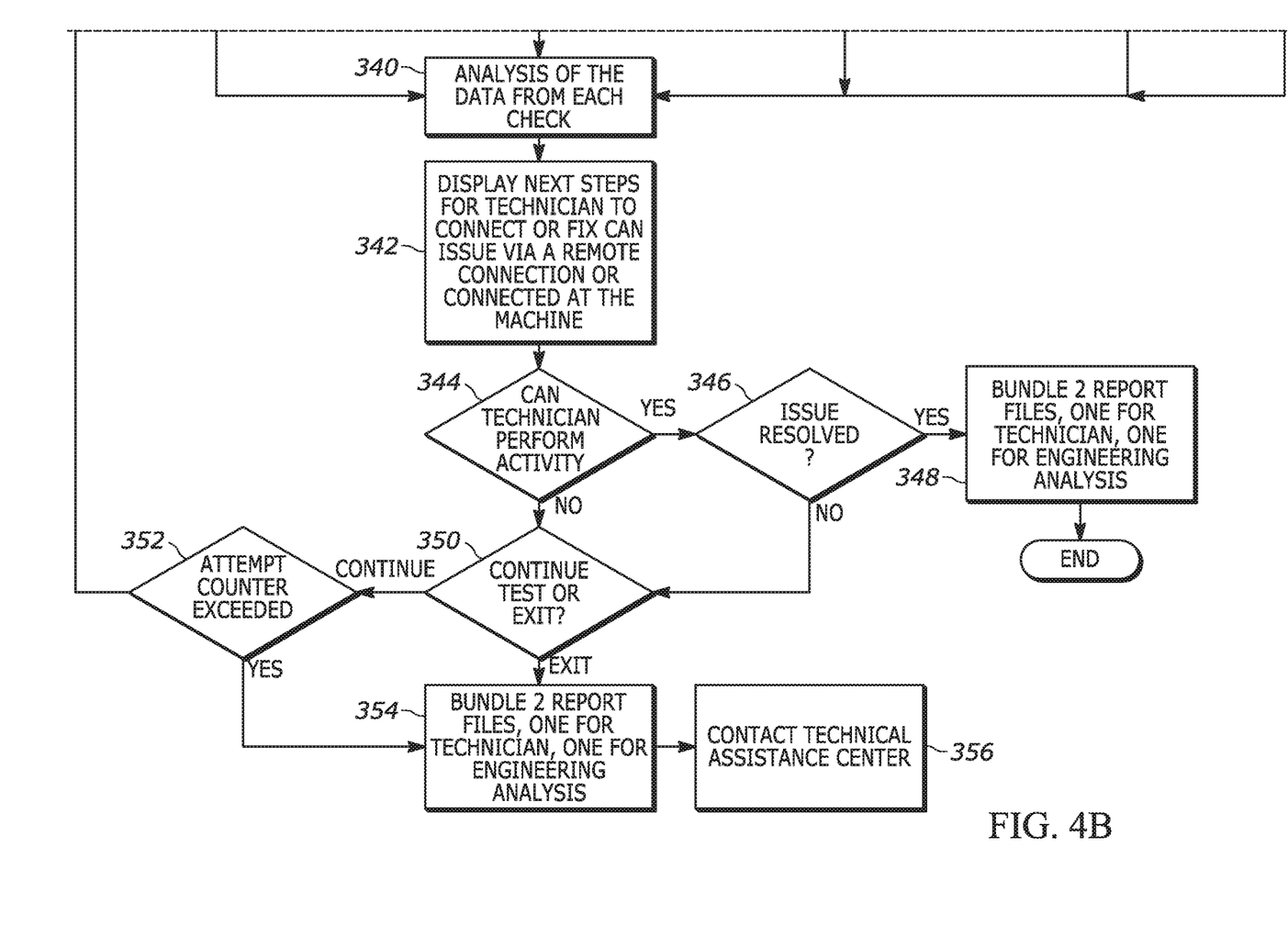

FIG. 4 shows a schematic of an exemplary embodiment of the CCH 30. In this description the term "CAN bus" is used but it is understood this refers to all types of communication systems (i.e. CAN, LIN, Ethernet, etc.).

When the CCH 30 is initiated (step 302) that machine telematics info is acquired (step 304) either from the machine or from a local database from stored information that has been captured and will be utilized for analysis. The telematics data can include: data shifts over time, sudden shifts in the data, data exceeding a threshold, data compared to other similar machines, etc.

The CCH data acquisition and analysis is split into three main components: software/computer check (step 306), connectivity check (step 308), and a CAN bus check (step 310). The software check (step 306) determines if there are any software, system, or computer problems causing the issue. The connectivity check (step 308) checks the connected status of various tools (e.g., a VCI) and/or other onboard components and methods of connectivity. The CAN bus check (step 310) determines if there are issues or problems with the CAN bus. The CCH 30 refers to a continuously updated database that can be maintained by the service tool development group to ensure components, software, and files are current in the diagnostic system or module, and/or on a machine.

The software and computer check (step 306) diagnoses and troubleshoots the software and systems needed to support proper service tool operation. A check for supporting applications or software for the service tool comprise (but not limited to) determining if there are any missing or outdated applications (step 312) such as, JAVA, Adobe, SOLR, ActiveX, or other software technologies as may be commonly employed. For example, multiple copies or versions of JAVA can cause conflicts that prevent proper service tool operation. If multiple versions are detected, then an error is generated as a conflict using registry keys or other software detection and registration methods, and then links are provided to the appropriate solution database or a knowledge base article that explain how to resolve the issue.

A computer check (step 314) includes checking for computer operating system issues, Vehicle Communication Interface (VCI) driver installation, overall versioning issues, adequate hard drive/RAM space, USB or other physical port drivers, computer battery charge level, etc. One example of the software check being utilized is when the VCI is not responding. The troubleshooting system and method determines that there is a missing file or driver and directs the user to a solution database and a knowledge base article explaining how to resolve the issue. In an example, if the RP1210 (Programming interface recommended practice) software installation failed during the service tool upgrade, a user can be instructed to run a stand-alone installer to resolve the issue. The user is instructed to uninstall the software and reinstall it with the executable file from a link in a knowledge base article. In some instances, the file will be downloaded and installed automatically. Another example is if any file is missing, conflicting, or mismatched, the error reporting is performed which then links to the appropriate solution database or knowledge base article to download the correct or missing file automatically or manually.

A service tool application health check (step 316) includes checking for necessary software version, updates or conflicts, driver updates or issues, missing files, etc. Software and driver updates could include base software updates, enhancements, and defect repairs, etc. Missing files or outdated versions could include necessary files such as Dynamic Link Library (DLL), INI, RP1210, Binary (BIN), Open Diagnostic eXchange (ODX), eXtensible Markup Language (XML), etc. This check is done by comparing the files to a metadata or xml file that is updated for every service tool software release. The xml file is also saved locally on the user's device for use when no Internet connection is available, and is updated at each new service tool software release.

A machine controller software check (step 318) includes determining if there are dependencies between different controllers for reprogramming, connecting, or other activities. It can also include checking for software version applicability and compatibility.

Applicable software check tasks are run in the background without user intervention such as CPU usage, RAM, USB port availability, etc. The software check tasks are also user initiated due to the time required to perform them, such as file compatibility checks.

The connectivity check (step 308) is used to diagnose and troubleshoot the sub-processes and tools needed to support proper service tool operation.

A VCI hardware status check (step 320) can be performed directly at the device or through a communication interface such as RP1210 (step 322). This can include a check of the VCI power source to the device. For example, the VCI may have become unplugged from the vehicle diagnostic connector, so the user is instructed to check the connections. The VCI version can also be checked. For example, the user may be attempting to program a controller with version 1 of a VCI, and version 3 is required due to updates for a new vehicle or engine. The VCI readiness can also be checked. For example, a ready status, and battery voltage is determined, and if it is too low, the user is instructed to connect a battery charger to the engine or vehicle. Based on the results of these checks, a solution may be provided to the user directly from the troubleshooting system and method, or the user is provided a link to the appropriate solution database or a knowledge base article that explains how to resolve the issue.

A check for available error logs/information (step 324) from the application responsible for machine (non-engine) controller software programming is performed. In this step, the system captures error information from the controller programming application. There are two types of errors, one from the component itself or its logs, and the other from a the primary software program which provides overall guidance and execution of configuration, calibration, and/or programming of one or more ECMs in a system, which further provides customization of the standard process to meet the needs of specific ECMs or systems. The system identifies the type of error and provides the user a link to the appropriate solution database or knowledge base article that explains how to resolve the issue. The appropriate solution database or knowledge base article can include error identification, for example recognized by an error numbering system or other identification system. The database also includes a description and potential solution to the problem or next best action.

A check for available error logs/information (step 326) from the application responsible for engine controller software programming is performed. In this step, the system captures error information from the engine controller programming application using an Application Programming Interface (API). The user is provided a link to the appropriate solution database or a knowledge base article that explains how to resolve the issue.

A check for available error logs/information (step 328) from the application responsible for processing the controller software is performed. Based on software type, the system calls lower level programming components like the engine and machine controller programming applications to obtain appropriate data.

The CAN bus check (step 310) determines if there are hardware or wiring issues that need to be repaired, controller issues that need to be addressed, or communication issues such as bus loading, interfering devices, intermittent issues, etc. The CAN bus check (step 310) can call the VCI status from the VCI (step 330) via a request and check, for example, bus or network statistics, baud rate, bus loading, error frames, controller address claim conflicts, and service tool address claims.

The system can also initiate a voltage pulse and perform Advanced CAN Diagnostics (step 332). This can include determining error counts and CAN bus voltage levels with a controlled impedance. An example of this is disclosed in U.S. Pat. No. 8,699,356, the disclosure of which is hereby incorporated by reference in its entirety.

A physical layer check (step 334) can be performed that check for the proper voltage, proper termination resistance value, and other physical layer attributes. A message check (step 336) can also be performed. Messages are transmitted and received and a "Start/Stop broadcast" command DM13 (referenced in SAE J1939 communications) is used and checked for effectiveness.

Additionally, the CAN bus check (step 310) can perform a controller response check (step 338). In the controller response check (step 338), the system will obtain the vehicle and/or engine serial number automatically or via user input. This information is used to query the appropriate controller databases to determine the number of controllers, which communication network each utilizes, and their layout. Additionally, the CCH 30 requests a response from all controllers on the network to compare the list based on actual responses with what is expected based on the database query.

Figure 5:
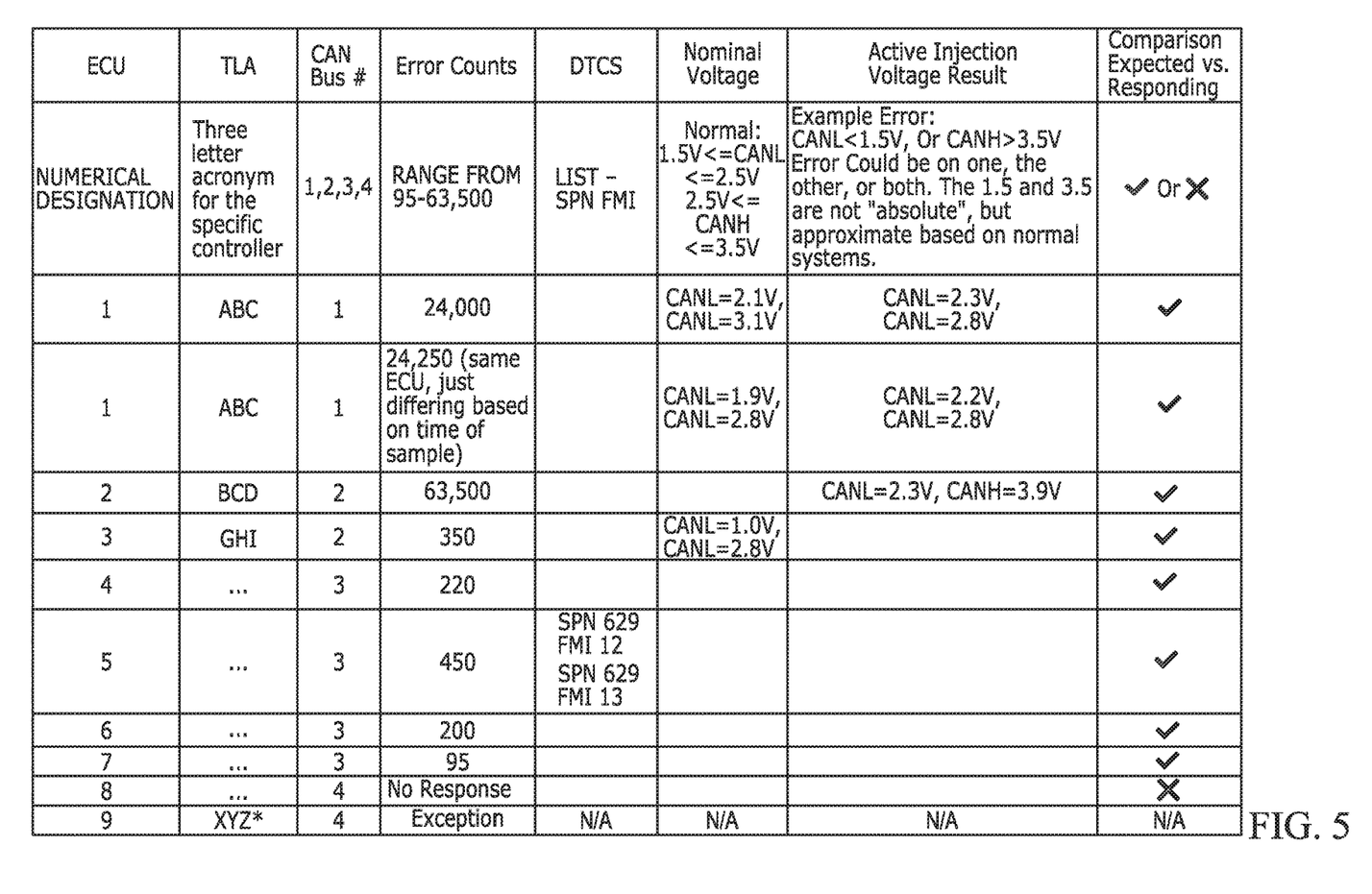
FIG. 5 is a table showing controller response information.

A table can be compiled which includes the troubleshooting information from the controller responses, as shown, for example, in FIG. 5. The information includes: the controller number and its acronym and the specific CAN bus the controller is on (e.g., CAN bus 1, 2, 3, or 4); error counts, defining a noise threshold beneath which it is considered "acceptable noise" in the data, which may be an absolute count, or it may be defined as a small percentage of the total errors (an ECU with an error count above the noise threshold can identify an issue with a harness and/or stub connection from the ECU to the nearest splice or connector); DTCs present for that controller (e.g., SAE J1939 defined suspect parameter number (SPN) and failure mode identifier (FMI)); the nominal voltage reported by each controller for the system voltage (typically 12 or 24V); the Nominal voltage reported by each controller for CAN voltages (typically 2.5V); voltage reading at each controller as a result of an Active Voltage Injection test; and a comparison of controllers expected on the communication network from the database query versus the list of controllers responding to an address claim request or other response command. Controller XYZ shown in the table represents a controller that does not provide error counts or DTCs and is considered an exception. The XYZ controller is displayed in the table but does not provide troubleshooting information for diagnosis. It may or may not be possible to query which CAN bus it is on and it may or may not provide an address claim. An example of this may be a joystick without diagnostics.

Figure 6:
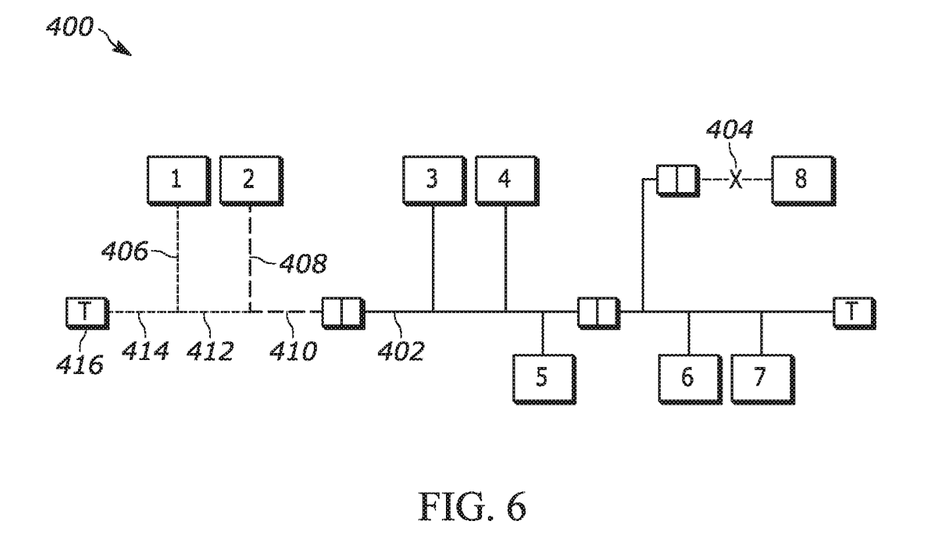
FIG. 6 is a schematic depicting a graphical representation of a controller layout.

The user can then be provided with a graphical network topology 400 of the controllers, an example of which is shown in FIG. 6. When a CAN bus issue has been identified, a user interface displays a graphical representation of the network and the location of the failure is displayed. The available information (error counters, DTCs and voltages) may be used individually, or in combination, to communicate to the user the most likely location on the topology where the fault can be found. For example, error counters alone may cause highlighting of the CAN wiring near an ECU, whereas the error counters in combination with voltage measurements may be indicative of a ground wiring issue to a specific ECU. Highlighting of the network segments may be accomplished in several or multiple ways to indicate the relative error rate for that segment; for example, with line thickness, colorization or other methods.

In an example, the CCH 30 performs the Advanced CAN Diagnostics tests on the network as discussed above (only error counters are described here). A scale is defined from minimum errors to maximum (e.g. 95 to 63,500). Where there is an order of magnitude or more between the minimum and the maximum, there can be a defined threshold, beneath which it is considered "acceptable noise" in the data (e.g. 10%=>635) and is not highlighted in any way 402. For each ECU that failed to respond, the harness stub is highlighted 404, and it is flagged as broken. For each ECU with an error count about the noise threshold, the harness stub from that ECU to the nearest splice or connector is highlighted 406, 408 based on its error count. For each segment 410, 412, 414, the segment is highlighted 412, 414 to the most severe level of any connected segment or stub 406, 408 based on the error count report from the ECUs 1, 2. The highlight may be extended to a segment 414 for which specific error count data may be unavailable, for example the segment connecting the CAN terminator 416.

Additionally, the schematic may be updated in real-time, which may then be influenced by machine vibration, and/or the technician may move about the machine and flex the harness, which could induce additional error behavior when the flex is local to the fault (e.g. an intermittent connection in a connector).

Returning to FIG. 4, after one or more of the checks 306, 308, 310 are performed, information is gathered and analyzed (step 340) and the user is provided a link to the appropriate solution database or knowledge base article that explains how to resolve the issue (step 342). For the three main checks 306, 308, 310, analysis of data from each is used to display the next steps for the technician to connect or fix the CAN issue via a remote connection or direct connection at the machine (step 342). This may include a solution that appears directly in the troubleshooting system and method, linking to the appropriate solution database or knowledge base article that explains how to resolve the issue, fixing the issue automatically, or directing the user to contact support for additional troubleshooting or resolution actions. In addition to identifying a Diagnostic Trouble Code, an error number, or other identifier, it can also provide a detailed description of the code or error and the solution to resolve it or the next best action or steps the user can take to resolve it. The CCH 30 can also include cognitive searching for finding solutions. For example, the problem contains "DLL", "JAVA", etc. and the CCH 30 searches for those words or phrases in a database to create or provide a solution.

A CAN traffic log is also collected and included in the return file for further analysis. Each of the steps can be performed independently or simultaneously (automatically or user selected). Troubleshooting decisions can be determined by the technician, or automatically by the CCH 30, to complete the repair process.

After receiving the next steps (step 342) the technician determines if they can perform the activity (step 344) and takes further action. If the technician can perform the activity, it is next determined if the issue is resolved (step 346). If the issue is resolved, a report is created and a copy is provided to the technician and to the OEM for analysis (step 348). If the technician cannot perform the activity or if the issue is not resolved, the technician has the opportunity to rerun the process (step 350) until either the issue is resolved or an attempt counter is exceeded (step 352). Once the attempt counter has been exceeded a report is created and a copy is provided to the technician and to the OEM for analysis (step 354) and the technician is instructed to contact technical assistance for further instructions (step 356).

The CCH 30 can also be integrated with, and supports machine health systems and processes which can include additional data collection, analysis, and solution delivery. For example, vehicle, machine, and engine data can be collected via Telematics (e.g., CAN bus error counts, computer statistics, etc.). Service tool usage data and metadata can also be collected (e.g., data collected from technicians solving similar connectivity or CAN bus issues). Data can also be collected from other systems, including warranty, technical assistance center, software repository, etc. (e.g., warranty claims, support cases, software download data that lead to problem recognition and resolution, etc.). Some of the analysis performed can include automated data analysis to determine solution or next best action and manual data review (e.g., engineering or technical assistance center reviews and provides solution, etc.). The solution deliver system can include automated delivery (e.g., John Deere Connected Support™ Expert Alert for a CAN or connectivity issue that is created based on the data collection and analysis and delivered to a Service Dealer or technician) or manual delivery (e.g., phone, email, text message, etc. from a technical assistance center or dealer to provide a solution to a problem).

The CCH 30 can also be integrated with, and supports ECMs and ECUs with internal diagnostic and test capabilities. This includes controllers with the hardware and software required for Advanced CAN Diagnostics such as error counts, voltage monitoring, and fault injection. The CCH 30 can perform some level of Advanced CAN Diagnostics, if the controllers do not contain the additional hardware and software, by using voltages measured by the VCI and sending the appropriate commands from the service tool. If the controllers contain the additional hardware and software, the CCH 30 can send commands for the controllers to perform the diagnostics and return the results to the service tool.

Controllers with interactive tests and diagnostics such as those used for AUTomotive Open System ARchitecture (AUTOSAR) and Unified Diagnostic Service (UDS) and On-Board Diagnostics (OBD) protocols are also included. The CCH 30 can send the commands to the controllers to perform software, connectivity, and CAN bus diagnostics, and they can include and return the results to the service tool.

The CCH 30 can incorporate additional checks not shown in FIG. 4. For example, an additional machine controller software check can include determining if there are dependencies between different controllers for reprogramming, connecting, or other activities and checking for software version applicability and compatibility. If the CCH 30 detects a connectivity issue that could be resolved by a software update to a controller, it could initiate the download and programming procedure, following all appropriate safety and security measures. An additional connectivity check can test for a Wi-Fi connection, its speed, signal strength, security, etc. between any service tool and interface device. For example, the connectivity check tests Wi-Fi between a laptop and a VCI. Another example includes a Wi-Fi connectivity check between a service tool and a Wi-Fi supported machine controller(s).

In some embodiments, electronic controllers have the built-in capability to perform self-diagnostics for connectivity and CAN bus issues. The data from those diagnostics are accessed and bundled, returned for analyses, troubleshooting and feedback. Additionally, the controller initiates additional abilities such as sending troubleshooting or error information to a display, service tool, or other interfacing device. Diagnostics incorporated into the controllers on the machine run manually or automatically and provide additional data to help resolve the issue. An example of this scenario is one where the controller has Advanced CAN Diagnostics and detects a nominal voltage shift as discussed in further detail in U.S. Pat. No. 8,699,356.

In some embodiments, the health checks are performed automatically without user initiation either via remote capabilities (such as telematics) or anytime the service tool is connected directly to the machine. Alternatively, some unobtrusive diagnostics are performed in the background automatically while others are run by user selection or as guided by analytics. The data collected and the analysis performed can also be updated in real time.

In some embodiments, the CCH 30 can be configured to turn off other controllers (mute them) and determine/isolate a faulty controller before the technician travels to the machine with parts. The CCH 30 can also capture "freeze frame" data, which provides the current state of the engine/ machine/vehicle (i.e., a snapshot of parameters at the time a DTC occurs). Freeze frame data can be provided as either a preselected list or all available data, that can be used to automatically or manually analyze an issue, and to provide the next best action or solution the user can take to resolve the issue. For example, if a CAN bus related DTC occurs, the CCH 30 can capture freeze frame data such as CAN error counts, CAN line voltages, and any missing messages.

An additional scenario is where the service tool is embedded into the machine itself, the operator may activate the tests, and see the results on the built-in display. The data collected may be cached for later transmission back to the process as previously described.

The CCH 30 can also be used for other network communication or protocol standards (i.e., LIN, Ethernet, RS-232, J1939, J1708, J1850, ISO15765, ISO9141, or KWP2000, etc.) where voltage measurements, error counters, or fault-injection techniques are applicable. In some embodiments, a request for data such as DTCs, or a recording of machine parameters, or another type of data request could be sent to the machine to provide additional troubleshooting information.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of diagnosing a connection or communication issue with an industrial machine comprising:
    connecting a diagnostic system to an electronic processing system of an industrial machine, wherein the electronic processing system includes a CAN bus and a plurality of controllers connected to the CAN bus, the plurality of controllers programmed to run one or more software applications;
    performing a software check to obtain software data related to the software applications, wherein the software check includes determining if there are any missing or outdated software applications;
    performing a connectivity check to obtain connection status data for one or more of the controllers;
    performing a CAN bus check to obtain CAN bus data, wherein the CAN bus check includes a controller response check;
    analyzing, by the diagnostic system, the software data, the connection status data, and the CAN bus data to determine a likely cause of an industrial machine connection or communication issue; and
    outputting a solution to the industrial machine connection or communication issue to a technician based on the analyzed data.

2. The method claim 1, wherein connecting the diagnostic system to the electronic processing system includes connecting from a remote location over a network or connecting locally on-site.

3. The method of claim 1, further comprising capturing and storing resolution information.

4. The method of claim 1, further comprising obtaining telematics data, wherein the telematics data includes past machine health data.

5. The method of claim 1, wherein performing the software check includes at least one of determining if there are any conflicting software applications, determining if there is a missing file or driver, determining if any software updates are needed, and determining if there are software dependencies between different controllers.

6. The method of claim 1, wherein performing the connectivity check includes at least one of performing a VCI hardware status check, obtaining RP1210 information, obtaining machine controller programming error logs, obtaining engine controller programming error objects, and obtaining software processor error logs.

7. The method of claim 1, wherein performing the CAN bus check includes at least one of performing a VCI status check, injecting a voltage pulse and performing an advanced CAN diagnostic, performing a physical layer check, and performing a message check.

8. The method of claim 1, wherein outputting a solution includes at least one of providing steps to resolve an issue, providing a solution article, and providing a link to further information.

9. An industrial machine connection and communication diagnostic system comprising:
    a diagnostic system having a communication interface configured to connect to an electronic processing system of an industrial machine, wherein the electronic processing system includes a CAN bus and a plurality of controllers connected to the CAN bus, the plurality of controllers programmed to run one or more software applications,
    wherein the diagnostic system includes one or more processors and is configured to,
        initiate a software check to obtain software data related to the software applications, wherein the software check includes determining if there are any missing or outdated software applications,
        initiate a connectivity check to obtain connection status data for one or more of the controllers,
        initiate a CAN bus check to obtain CAN bus data, wherein the CAN bus check includes a controller response check, and
        analyze the software data, the connection status data, and the CAN bus data to determine a likely cause of an industrial machine connection or communication issue and output a solution to the industrial machine connection or communication issue to a technician based on the analyzed data.

10. The connection and communication diagnostic system of claim 9, wherein the communication interface includes at least one of a wired connection and a wireless connection.

11. The connection and communication diagnostic system of claim 9, wherein initiating the software check includes at least one of determining if there are any conflicting software applications, determining if there is a missing file or driver, determining if any software updates are needed, and determining if there are software dependencies between different controllers.

12. The connection and communication diagnostic system of claim 9, wherein performing the connectivity check includes at least one of performing a VCI hardware status check, obtaining RP1210 information, obtaining machine controller programming error logs, obtaining engine controller programming error objects, and obtaining software processor error logs.

13. The connection and communication diagnostic system of claim 9, wherein performing the CAN bus check includes at least one of performing a VCI status check, injecting a voltage pulse and performing an advanced CAN diagnostic, performing a physical layer check, and performing a message check.

14. The connection and communication diagnostic system of claim 9, wherein outputting a solution includes at least one of providing steps to resolve an issue, providing a solution article, and providing a link.

15. The connection and communication diagnostic system of claim 9, wherein the diagnostic module is configured to receive telematics data, wherein the telematics data includes past machine health data that is analyzed with the software data, the connection status data, and the CAN bus data to determine the likely cause of an industrial machine connection or communication issue.

16. An industrial machine connection and communication diagnostic system comprising:
- a communication interface configured to connect to an electronic processing system of an industrial machine, wherein the electronic processing system includes a CAN bus and a plurality of controllers connected to the CAN bus, the plurality of controllers programmed to run one or more software applications; and
- a diagnostic application implemented by one or more processors and configured to initiate a controller response check, the controller response check including determining the number of controllers and the controller layout, requesting a response from each controller, providing a graphical representation of the controller layout, determining a fault, and displaying the location of the fault on the graphical representation.

17. The industrial machine connection and communication diagnostic system of claim 16, wherein determining the fault includes at least one of obtaining error counts, obtaining diagnostic trouble codes, and obtaining voltage readings.

18. The industrial machine connection and communication diagnostic system of claim 16, wherein the fault indicates a wiring fault.

19. The industrial machine connection and communication diagnostic system of claim 16, wherein displaying the fault on the graphical representation includes highlighting a network segment.

20. The industrial machine connection and communication diagnostic system of claim 16, wherein the graphical representation is updated in real time.

* * * * *